(12) United States Patent
Watanabe et al.

(10) Patent No.: US 12,153,824 B2
(45) Date of Patent: Nov. 26, 2024

(54) MEMORY SYSTEM

(71) Applicant: KIOXIA CORPORATION, Tokyo (JP)

(72) Inventors: Takuzo Watanabe, Kawasaki Kanagawa (JP); Shigeo Kurakata, Fujisawa Kanagawa (JP); Katsuhiko Iwai, Yokohama Kanagawa (JP)

(73) Assignee: Kioxia Corporation, Tokyo (JP)

( * ) Notice: Subject to any disclaimer, the term of this patent is extended or adjusted under 35 U.S.C. 154(b) by 51 days.

(21) Appl. No.: 17/592,466

(22) Filed: Feb. 3, 2022

(65) Prior Publication Data

US 2023/0089246 A1    Mar. 23, 2023

(30) Foreign Application Priority Data

Sep. 21, 2021    (JP) ................. 2021-153212

(51) Int. Cl.
*G06F 3/06*    (2006.01)

(52) U.S. Cl.
CPC .......... *G06F 3/0655* (2013.01); *G06F 3/0604* (2013.01); *G06F 3/0679* (2013.01)

(58) Field of Classification Search
USPC ....................................................... 711/154
See application file for complete search history.

(56) References Cited

U.S. PATENT DOCUMENTS

| | | | | |
|---|---|---|---|---|
| 7,103,732 | B1 * | 9/2006 | Chang | G06F 12/0246 711/155 |
| 8,447,915 | B2 | 5/2013 | Araki et al. | |
| 9,146,875 | B1 * | 9/2015 | Boyle | G06F 3/0619 |
| 10,289,548 | B1 * | 5/2019 | Ho | G06F 12/0261 |
| 2011/0191521 | A1 * | 8/2011 | Araki | G06F 12/0246 711/E12.008 |
| 2011/0264848 | A1 | 10/2011 | Suzuki | |
| 2012/0030413 | A1 | 2/2012 | Miyagawa et al. | |
| 2014/0164881 | A1 * | 6/2014 | Chen | G11C 29/028 714/773 |
| 2017/0123730 | A1 * | 5/2017 | Losh | G06F 3/067 |
| 2019/0056888 | A1 * | 2/2019 | Kwon | G06F 3/0659 |
| 2020/0264810 | A1 * | 8/2020 | Ahirwar | G06F 3/0659 |

(Continued)

FOREIGN PATENT DOCUMENTS

| | | |
|---|---|---|
| JP | 2011227802 A | 11/2011 |
| JP | 2012-164114 A | 8/2012 |

(Continued)

OTHER PUBLICATIONS

Notice of Reasons for Refusal mailed Oct. 1, 2024 in corresponding Japanese Patent Application 2021-153212 with English Translation, 8 pages.

*Primary Examiner* — Yaima Rigol
*Assistant Examiner* — Elias Young Kim
(74) *Attorney, Agent, or Firm* — Kim & Stewart LLP (57) ABSTRACT

A memory system comprises a nonvolatile memory including a plurality of blocks, a memory controller capable of controlling the nonvolatile memory, and a tag information management table in which tag information allocated to an address of data written to a block of nonvolatile memory, is stored, wherein the tag information is representative of the number of erasures of the block. The memory controller performs garbage collection of the nonvolatile memory based on the tag information.

9 Claims, 9 Drawing Sheets

TAG ID ALLOCATION TABLE

| TAG ID | AVERAGE NUMBER OF ERASURES | | | |
|---|---|---|---|---|
| | FIRST ROUND | SECOND ROUND | ... | nTH ROUND |
| 0 | INVALID DATA | | | |
| 1 | 1-5 TIMES | 76-80 TIMES | ... | ((n - 1) * NUMBER OF TAG IDS + (TAG ID - 1)) * 5 + 1 TO ((n - 1) * NUMBER OF TAG IDS + TAG ID) * 5 TIMES |
| 2 | 6-10 TIMES | 81-85 TIMES | ... | |
| 3 | 11-15 TIMES | 86-90 TIMES | ... | |
| 4 | 16-20 TIMES | 91-95 TIMES | ... | |
| 5 | 21-25 TIMES | 96-100 TIMES | ... | |
| 6 | 26-30 TIMES | 101-105 TIMES | ... | |
| 7 | 31-35 TIMES | 106-110 TIMES | ... | |
| 8 | 36-40 TIMES | 111-115 TIMES | ... | |
| 9 | 41-45 TIMES | 116-120 TIMES | ... | |
| 10 | 46-50 TIMES | 121-125 TIMES | ... | |
| 11 | 51-55 TIMES | 126-130 TIMES | ... | |
| 12 | 56-60 TIMES | 131-135 TIMES | ... | |
| 13 | 61-65 TIMES | 136-140 TIMES | ... | |
| 14 | 66-70 TIMES | 141-145 TIMES | ... | |
| 15 | 71-75 TIMES | 146-150 TIMES | ... | |

(56) References Cited

U.S. PATENT DOCUMENTS

2020/0333958 A1\* 10/2020 Lee ..................... G06F 3/0652
2021/0026733 A1\* 1/2021 Lee ..................... G06F 11/0787
2021/0216474 A1\* 7/2021 Muchherla .......... G06F 11/3037
2022/0366999 A1\* 11/2022 Kumar ............... G11C 16/3495

FOREIGN PATENT DOCUMENTS

JP        2012033002 A     2/2021
WO     2011-010348 A1    1/2011

\* cited by examiner

TAG ID ALLOCATION TABLE

| TAG ID | AVERAGE NUMBER OF ERASURES | | | |
|---|---|---|---|---|
| | FIRST ROUND | SECOND ROUND | ... | nTH ROUND |
| 0 | INVALID DATA | | | |
| 1 | 1-5 TIMES | 76-80 TIMES | ... | ((n - 1) * NUMBER OF TAG IDS + (TAG ID - 1)) * 5 + 1 TO ((n - 1) * NUMBER OF TAG IDS + TAG ID) * 5 TIMES |
| 2 | 6-10 TIMES | 81-85 TIMES | ... | |
| 3 | 11-15 TIMES | 86-90 TIMES | ... | |
| 4 | 16-20 TIMES | 91-95 TIMES | ... | |
| 5 | 21-25 TIMES | 96-100 TIMES | ... | |
| 6 | 26-30 TIMES | 101-105 TIMES | ... | |
| 7 | 31-35 TIMES | 106-110 TIMES | ... | |
| 8 | 36-40 TIMES | 111-115 TIMES | ... | |
| 9 | 41-45 TIMES | 116-120 TIMES | ... | |
| 10 | 46-50 TIMES | 121-125 TIMES | ... | |
| 11 | 51-55 TIMES | 126-130 TIMES | ... | |
| 12 | 56-60 TIMES | 131-135 TIMES | ... | |
| 13 | 61-65 TIMES | 136-140 TIMES | ... | |
| 14 | 66-70 TIMES | 141-145 TIMES | ... | |
| 15 | 71-75 TIMES | 146-150 TIMES | ... | |

TAG ID ALLOCATION TABLE

| TAG ID | AVERAGE NUMBER OF ERASURES |
|---|---|
| 0 | INVALID DATA |
| 1 | 1-15 TIMES |
| 2 | 16-30 TIMES |
| ⋮ | ⋮ |
| 199 | 2971-2985 TIMES |
| 200 | 2986-3000 TIMES |
| 201 | UNUSED |
| ⋮ | ⋮ |
| 256 | UNUSED |

MEMORY SYSTEM

CROSS-REFERENCE TO RELATED APPLICATION

This application is based upon and claims the benefit of priority from Japanese Patent Application No. 2021-153212, filed Sep. 21, 2021, the entire contents of which are incorporated herein by reference.

FIELD

Embodiments described herein relate generally to a memory system.

BACKGROUND

In recent years, memory systems including nonvolatile memory such as NAND flash memory have become common.

DETAILED DESCRIPTION

Embodiments provide a memory system having a semiconductor memory device, which reduces segmentation of data to improve reliability of the data stored in the semiconductor memory device.

In general, according to one embodiment, a memory system comprises a nonvolatile memory including a plurality of blocks, a memory controller capable of controlling the nonvolatile memory, and a tag information management table in which tag information allocated to an address of data written to a block of the nonvolatile memory, is stored, wherein the tag information is representative of the number of erasures of the block. The memory controller performs garbage collection of the nonvolatile memory based on the tag information.

Hereinafter, according to embodiments, the same reference numerals are given to substantially the same elements and description thereof will not be repeated.

First Embodiment

A memory system according to a first embodiment will be described with reference to FIGS. 1 to 7.
(Configuration)

A configuration of the memory system according to the first embodiment will be described with reference to FIGS. 1 to 4.

Figure 1:
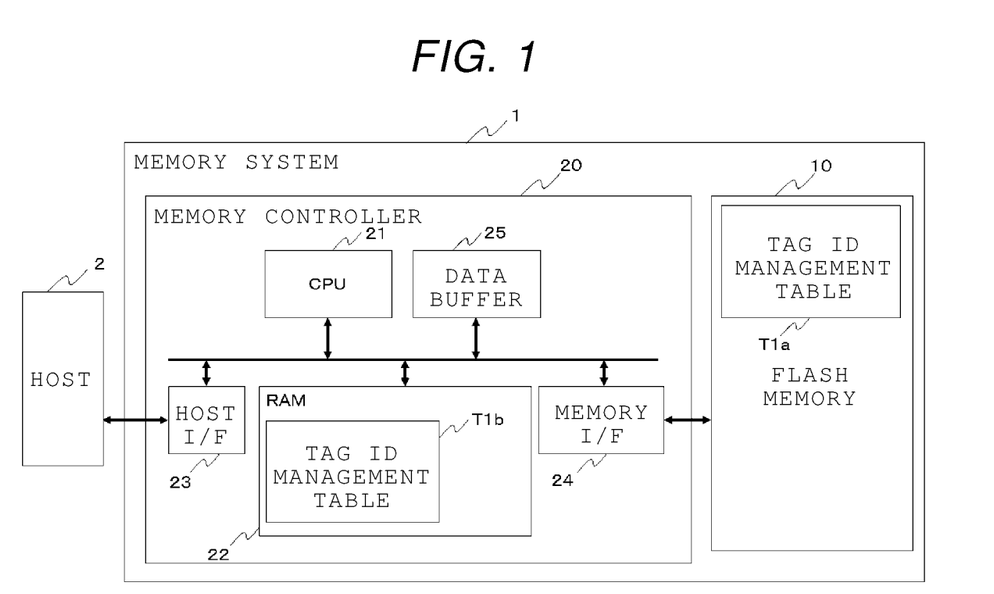
FIG. 1 is a block diagram illustrating an example of a configuration of a memory system according to a first embodiment.

FIG. 1 is a block diagram illustrating an example of a configuration of the memory system according to the first embodiment. A memory system 1 includes a nonvolatile memory and a memory controller 20 and is controlled by a host 2. The memory system according to the embodiment includes, for example, a NAND flash memory 10 (hereinafter simply referred to as a flash memory and more generally referred to as a nonvolatile memory). The host 2 is an information processing device that accesses the memory system 1. The host 2 may be a server that stores a large amount and various types of data in the memory system 1 or may be a personal computer.

The memory system 1 can be used as a main storage of the host 2. The memory system 1 may be integrated in the host 2 or may be connected to the host 2 via a cable or a network. The memory system 1 is, for example, a solid state drive (SSD), an SD® card, an embedded multimedia card (eMMC), or a universal flash storage (UFS).

The flash memory 10 is controlled by the memory controller 20. In the embodiment, the flash memory 10 is given as an example of a nonvolatile memory, but other embodiments are not limited thereto. The nonvolatile memory may be, for example, any one of a NAND flash memory, a NOR flash memory, a magneto-resistive random access memory (MRAM), a phase change random access memory (PRAM), a resistive random access memory (ReRAM), and a ferroelectric random access memory (FeRAM).

The flash memory 10 includes a memory cell array that includes a plurality of memory cells located in a matrix configuration. The memory cell array includes a plurality of blocks. A block functions as a minimum unit for a data erasing operation. Each block includes a plurality of pages.

Each of the plurality of pages includes one bit of data stored across a plurality of memory cells connected to the same word line. The page is a unit for a data write operation and a data read operation. Instead of one page, multiple bits of data stored across a plurality of memory cells connected commonly to one word line may be a unit for the data write operation or the data read operation. The flash memory 10 may have a 2-dimensional structure or a 3-dimensional structure.

The flash memory 10 can store, for example, firmware, a tag ID allocation table, a tag ID management table T1a.

The memory controller 20 can receive a command from the host 2 and control the flash memory 10 based on the received command. The memory controller 20 can be implemented by, for example, a circuit such as a system on a chip (SoC). The memory controller 20 includes a control unit, a random access memory (RAM) 22, a host interface circuit (hereinafter simply referred to as a host I/F) 23, a memory interface circuit (hereinafter simply referred to as a memory I/F) 24, and a data buffer 25.

The control unit is, for example, a central processing unit (CPU) 21. The CPU 21 can control an operation of the entire memory controller 20. The CPU 21 controls an operation of the memory controller 20, for example, by executing firmware loaded on the RAM 22.

The RAM 22 is an example of a volatile memory. The RAM 22 can store, for example, firmware, a tag ID allocation table, a tag ID management table T1b, and the like loaded from the flash memory 10 and is used as a work area of the CPU 21. The RAM 22 may be provided outside the memory controller 20 or may be provided in the memory controller 20. For example, it is noted that a dynamic random access memory (DRAM) or a static random access memory (SRAM) is used as the RAM 22.

The host I/F 23 is connected to the host 2 via a host bus and governs communication between the memory system 1 and the host 2. The host bus is, for example, a bus that conforms to an SD interface standard. The host I/F 23 controls transmission of data, commands, and addresses between the memory system 1 and the host 2.

The memory I/F 24 is connected to the flash memory 10 via a NAND bus and governs communication between the memory controller 20 and the flash memory 10. The NAND bus is, for example, a bus that transmits and receives signals in conformity with a NAND interface standard.

The data buffer 25 temporarily stores data received from the host 2 or data read from the flash memory 10. The data buffer 25 is a volatile memory. The RAM 22 function as the data buffer 25.

Figure 2:
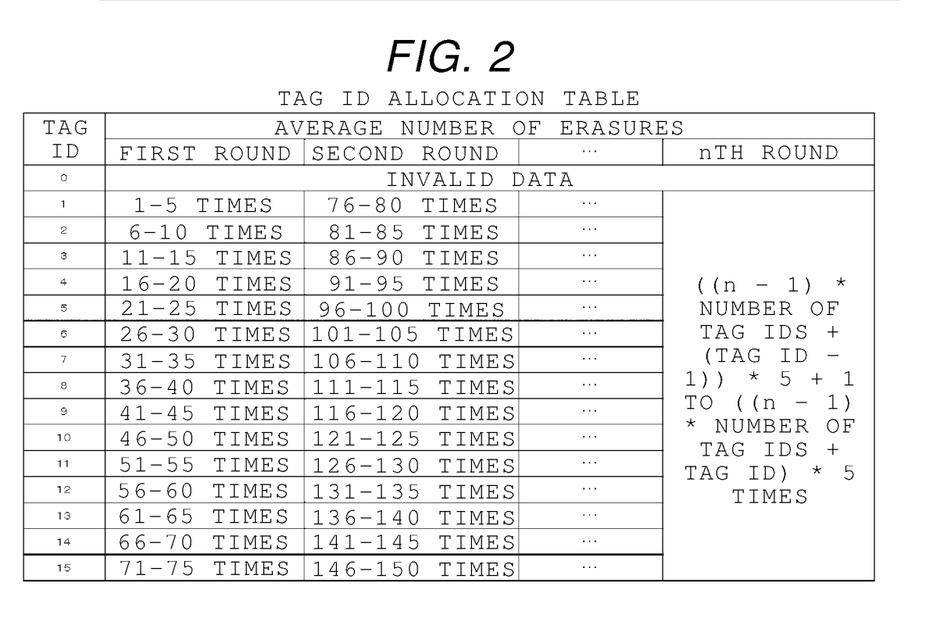
FIG. 2 is a diagram illustrating an example of a configuration of a tag information allocation table used in the memory system according to the first embodiment.

FIG. 2 is a diagram illustrating an example of a configuration of a tag information allocation table used in the memory system according to the first embodiment. In description of the embodiment, a tag ID is tag information. As illustrated in FIG. 2, the tag ID allocation table shows a correspondence between a tag ID and an average number of erasures of the flash memory 10. The average number of erasures indicates an average of the number of erasures per block, which is calculated as (sum of the numbers of erasures of all blocks of the flash memory 10)/(the number of all blocks of the flash memory 10). In the embodiment, however, as will be described below, an average number of write commands issued to the memory system 1 by the host 2 per block is considered to be representative of a number that is proportional to the average number of erasures.

A data write operation performed on a nonvolatile memory such as the flash memory 10 includes new data writing and data updating. A write operation when updating data, for example, employs an overwriting scheme and a logical overwriting scheme.

The overwriting scheme is a scheme in which pseudo-overwriting is performed on the flash memory 10 in which overwriting is not possible. In the pseudo-overwriting scheme, when data at any position of any block is updated, all the data is temporarily evacuated from the block. Then, an erasing operation is performed on the block, and then the evacuated data including the updated data is written to the block in the block unit again.

On the other hand, in the logical overwriting scheme, data writing is performed in units of pages. In the logical overwriting scheme, when data is updated, a page containing the data is invalidated and the updated data is written in a separate block or a separate page of the same block. A logical address is not changed and a physical address corresponding to the logical address is changed.

As described above, when data is updated in the flash memory 10, data invalidation or data erasing operation are involved in some cases. That is, an average number of write commands issued to the memory system 1 per block is associated with the average number of erasures of the flash memory 10. Therefore, in the description of the embodiment, an average number of write commands issued to the memory system 1 per block is assumed to be representative of an average number of erasures of the flash memory 10.

The average number of write commands issued to the memory system 1 per block increases over time. Accordingly, the average number of erasures of the flash memory 10 also increases over time. It is noted that the average number of write commands issued to the memory system 1 per block is managed by, for example, the memory controller 20.

In the embodiment, it is noted that the average number of erasures and the average number of write commands issued to the memory system 1 by the host 2 per block are examples of parameters. Any information regarding the number of erasures such as the number of write commands, the number of erasure commands, and the number of actual erasures issued to the memory system 1 by the host 2, and a combination thereof may be used as parameters. For example, in description of the embodiment, the average number of write commands issued to the memory system 1 by the host 2 per block is considered to be representative of an average number of erasures, but an average number of actual erasures may be used as such a parameter. The embodiment is not limited to the number of write commands issued to the memory system 1 by the host 2. Instead, the average number of commands issued to the memory system 1 by the host 2 per block including another command, such as an erasure command, may be considered to be representative of an average number of erasures.

In the embodiment, the tag ID is an identifier allocated to each logical address based on the average number of erasures. In the embodiment, the tag ID is allocated to each logical address in units of 4 KB. In the embodiment, the tag ID is 4 bits and there are 16 IDs from a tag ID=0 to a tag ID=15. The tag ID=0 indicates that written data is invalid data. The 15 IDs from a tag ID=1 to the tag ID=15 indicate that written data is valid data. The 15 IDs are allocated based on the average number of erasures so that the tag ID increases by 1 whenever the average number of erasures increases 5 times. As illustrated in FIG. 2, for example, in the case of data written when the average number of erasures is 5 times, the tag ID=1 is allocated to a logical address. It is noted that the tag ID may be represented by less than or greater than 4 bits. An increase in the average number of erasures that increases the tag ID by 1, is not limited to 5 times, and may be less than or greater than 5. As illustrated in FIG. 2, the tag IDs may be circulated and used in accordance with an increase in the average number of erasures. When the tag ID is used at an nth round, the average number of erasures is obtained from the equation: [((n−1)*(number of tag IDs allocated based on average number of erasures)+(tag ID−1))*(average number of erasures corresponding to increase in one tag ID)+1] to [((n−1)*(number of tag IDs allocated based on average number of erasures)+tag ID)*(average number of erasures corresponding to increase in one tag ID)]. In the embodiment, since the number of tag IDs allocated based on the average number of erasures is 15 and the average number of erasures corresponding to an increase in one tag ID is 5 times, for example, when the tag ID=5 at the third round, the average number of erasures of the flash memory 10 when the data is written is obtained as 171 to 175 times.

Figure 3A:
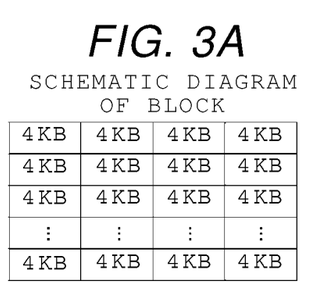
FIG. 3A is a diagram schematically illustrating blocks of a nonvolatile memory in the memory system according to the first embodiment and FIG. 3B is a diagram illustrating an example of a configuration of a first tag information management table used in the memory system according to the first embodiment.
Figure 3B:
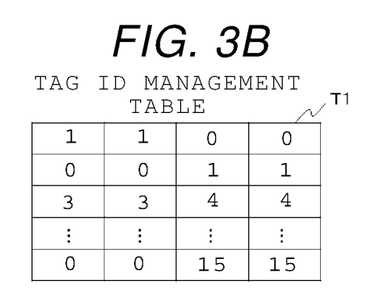

FIG. 3A is a diagram schematically illustrating blocks of a nonvolatile memory in the memory system according to the first embodiment. FIG. 3B is a diagram illustrating an example of a configuration of a first tag information management table used in the memory system according to the first embodiment.

The first tag information management table is a table in which tag information allocated to each logical address is managed. In the embodiment, the first tag information management table is a tag ID management table T1 (T1a and T1b).

Specifically, for example, as illustrated in FIG. 3A, a physical address of each block is partitioned for every 4 KB. In the tag ID management table T1, as illustrated in FIG. 3B, the tag ID allocated to each logical address of 4 KB is recorded based on the tag ID allocation table so as to correspond to a physical address per 4 KB of each block illustrated in FIG. 3A. The block shown in FIG. 3A corresponds to a block that is the erasing unit, and each sector (4 KB) corresponds to a page, for example. The data received by the memory system 1 along with the logical address, is written to the physical address of the flash memory 10 corresponding to the logical address.

(Operation)

An operation of the memory system according to the first embodiment will be described with reference to FIGS. 4 to 7.

(Write Operation and Tag ID Write Operation)

Figure 4:
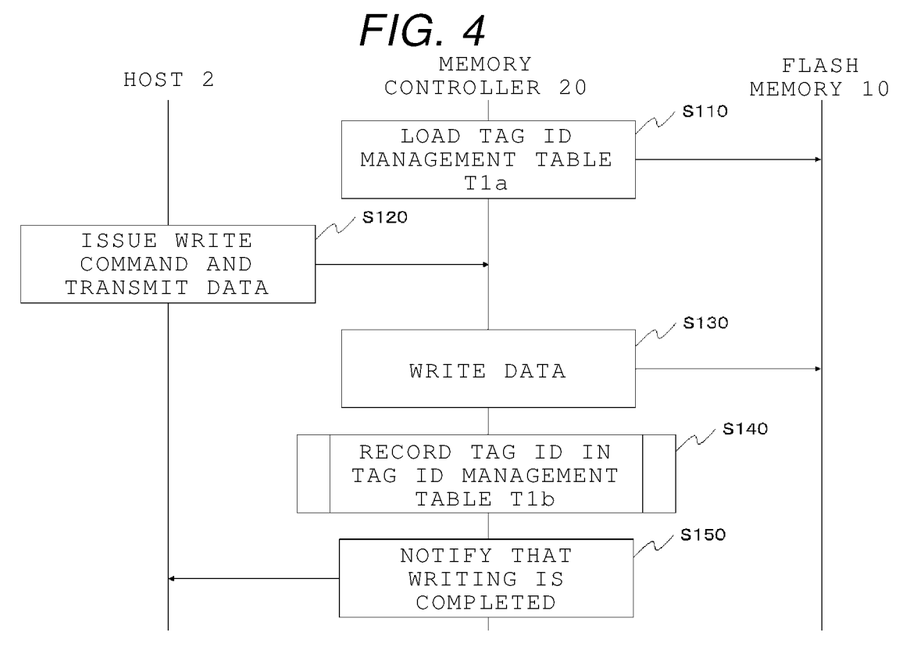
FIG. 4 is a sequence diagram illustrating a write operation and a tag information write process in the memory system according to the first embodiment.

FIG. 4 is a sequence diagram illustrating a write operation and a tag information write process in the memory system according to the first embodiment.

After the memory system 1 is powered on, the memory controller 20 loads the data of the tag ID management table T1a from the flash memory 10 into the tag ID management table T1b stored in the RAM 22 (S110). In description of the embodiment, after the memory system 1 is powered on, the data of the tag ID management table T1a is loaded into the tag ID management table T1b stored in the RAM 22. A timing at which the tag ID management table T1a is loaded into the tag ID management table T1b stored in the RAM 22 is not limited thereto.

The host 2 issues a write command to the memory controller 20 and transmits data to the memory controller 20 (S120).

The memory controller 20 receives the write command and the data from the host 2. Then, in response to the reception of the write command and the data, data is written to the flash memory 10 (S130). The memory controller 20 counts the number of write commands received from the host 2. It is noted that the memory controller 20 may set any timing as a timing at which the number of write commands received from the host 2 is counted. Here, it is desirable to set the timing before the tag ID is recorded in the tag ID management table T1b.

The memory controller 20 allocates the tag ID to a logical address to which the data is written based on the tag ID allocation table and records the tag ID in the tag ID management table T1b stored in the RAM 22 (S140).

When the tag ID writing to the tag ID management table T1b is completed, the memory controller 20 notifies the host 2 that the data writing is completed and completes the writing and the tag ID write process (S150).

In the embodiment, the memory controller 20 notifies the host 2 that the data writing is completed after the tag ID writing to the tag ID management table T1b (S140) is completed. Alternatively, the memory controller 20 may notify the host 2 that the data writing is completed after the data writing to the flash memory 10 (S130) is performed. In this case, after the memory controller 20 notifies the host 2 that the data writing is completed, the memory controller 20 writes the tag ID to the tag ID management table T1b.

As described above, the tag ID is allocated at a timing at which data is written to the flash memory 10. The tag ID management table T1b stored in the RAM 22 is updated at the timing at which data is written to the flash memory 10. For example, before the memory system 1 is powered off, the updated tag ID management table T1b may be written to the tag ID management table T1a stored in the flash memory 10 to update the tag ID management table T1a stored in the flash memory 10. A timing at which the tag ID management table T1a stored in the flash memory 10 is updated is not limited thereto. For example, the tag ID management table Ta stored in the flash memory 10 may be updated when writing is not performed for a given period of time or may be updated at any timing.

Figure 5:
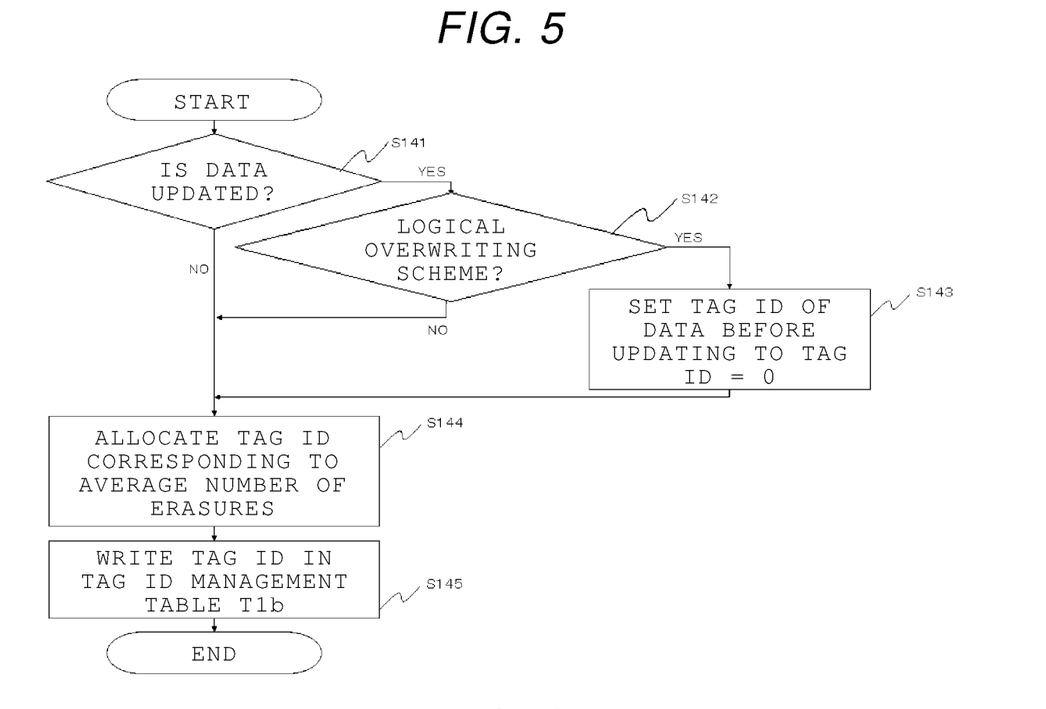
FIG. 5 is a flowchart illustrating the write operation and the tag information write process of a memory controller of the memory system according to the first embodiment.

FIG. 5 is a flowchart illustrating a write operation and the tag information write process of a memory controller of the memory system according to the first embodiment. The tag ID write process will be described with reference to FIG. 5 in more detail than in step S140 in the memory controller 20.

When the data writing to the flash memory 10 is performed (S130), the memory controller 20 first determines whether a write operation is data updating (S141).

When the write operation is not the data updating (NO in S141), that is, when the write operation is a new data writing, the process proceeds to step S144. On the other hand, when the write operation is the data updating (YES in S141), the memory controller 20 determines whether the logical overwriting scheme is used (S142).

When the logical overwriting scheme is not used (NO in S142), that is, when the pseudo-overwriting scheme is used, the process proceeds to step S144. On the other hand, when the logical overwriting scheme is used (YES in S142), a physical address at which data before updating is stored is invalidated. Accordingly, the tag ID recorded in the tag ID management table T1b corresponding to the physical address at which the data before updating is stored, is set to the tag ID=0 (S143).

Subsequently, the memory controller 20 allocates the tag ID to a logical address at which new data or updated data is stored, based on the tag ID allocation table (S144).

The memory controller 20 writes the tag ID allocated in step S144 to the tag ID management table corresponding to the logical address at which the new data or the updated data is stored.

When the tag ID writing to the tag ID management table is completed, the process proceeds to step S150 illustrated in FIG. 4 and the memory controller 20 completes the write operation and the tag ID write process in the memory system 1.

(Erasing Operation and Tag ID Write Operation)

Figure 6:
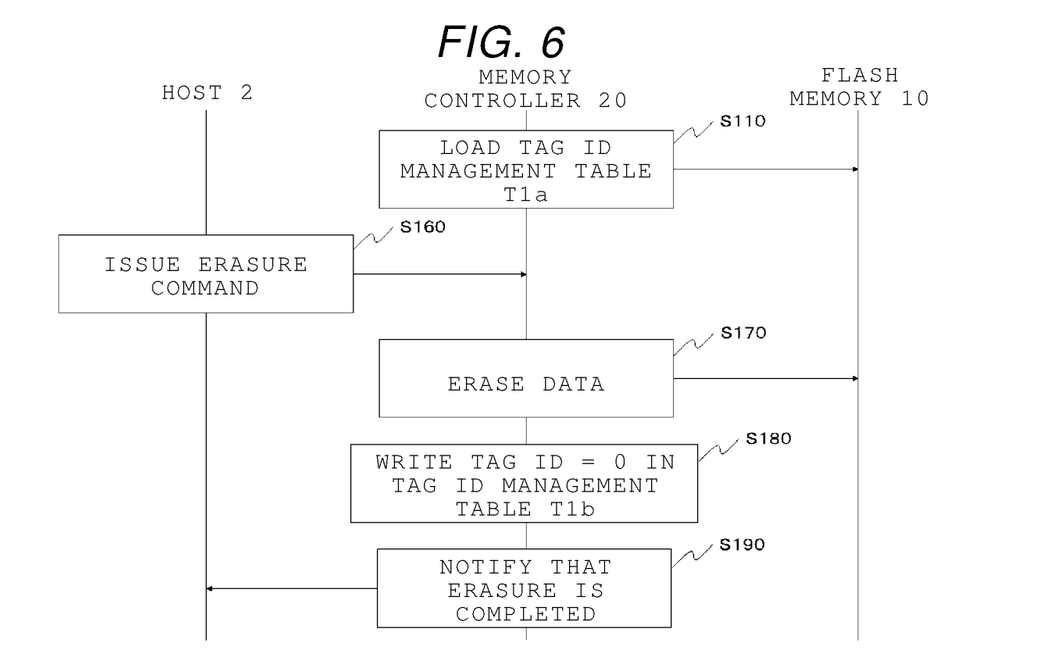
FIG. 6 is a sequence diagram illustrating an erasing operation and the tag information write process in the memory system according to the first embodiment.

FIG. 6 is a sequence diagram illustrating an erasing operation and a tag information write process in the memory system according to the first embodiment.

After the memory system 1 is powered on, the memory controller 20 loads the data of the tag ID management table T1a into the tag ID management table T1b stored in the RAM 22 (S110) from the flash memory 10. In description of the embodiment, after the memory system 1 is powered on, the data of the tag ID management table T1a is loaded into the tag ID management table T1b stored in the RAM 22. A timing at which the data of the tag ID management table T1a is loaded into tag ID management table T1b stored in the RAM 22 is not limited thereto. When the data of the tag ID management table T1a is already loaded into the tag ID management table T1b stored in the RAM, step S110 does not need to be performed.

The host 2 issues an erasure command to the memory controller 20 (S160).

The memory controller 20 receives the erasure command from the host 2. Then, in response to the reception of the erasure command, the data is erased (S170).

The memory controller 20 allocates the tag ID based on the tag ID allocation table and records the tag ID in the tag ID management table T1b stored in the RAM 22. In the erasure operation, to erase the data, the tag ID=0 is written to the tag ID management table T1b of a block in which the erasure operation is performed (S180).

When the tag ID writing is completed, the memory controller 20 notifies the host 2 that the data erasing is completed, the erasure operation and the tag ID write process are completed (S190).

In the embodiment, after the tag ID writing to the tag ID management table T1b (S180) is completed, the memory controller 20 notifies the host 2 that the data erasing is completed. Alternatively, after the data erasing in the flash memory 10 (S170) is performed, the memory controller 20 may notify the host 2 that the data erasing is completed. In this case, after the memory controller 20 notifies the host 2 that the data erasing is completed, the memory controller 20 writes the tag ID to the tag ID management table T1b.

(Garbage Collection)

A garbage collection operation in the memory controller 20 will be described with reference to FIG. 7.

In the embodiment, garbage collection is a process performed to collect valid data written during the same period. The period for which the valid data is written is represented by the tag information.

Figure 7:
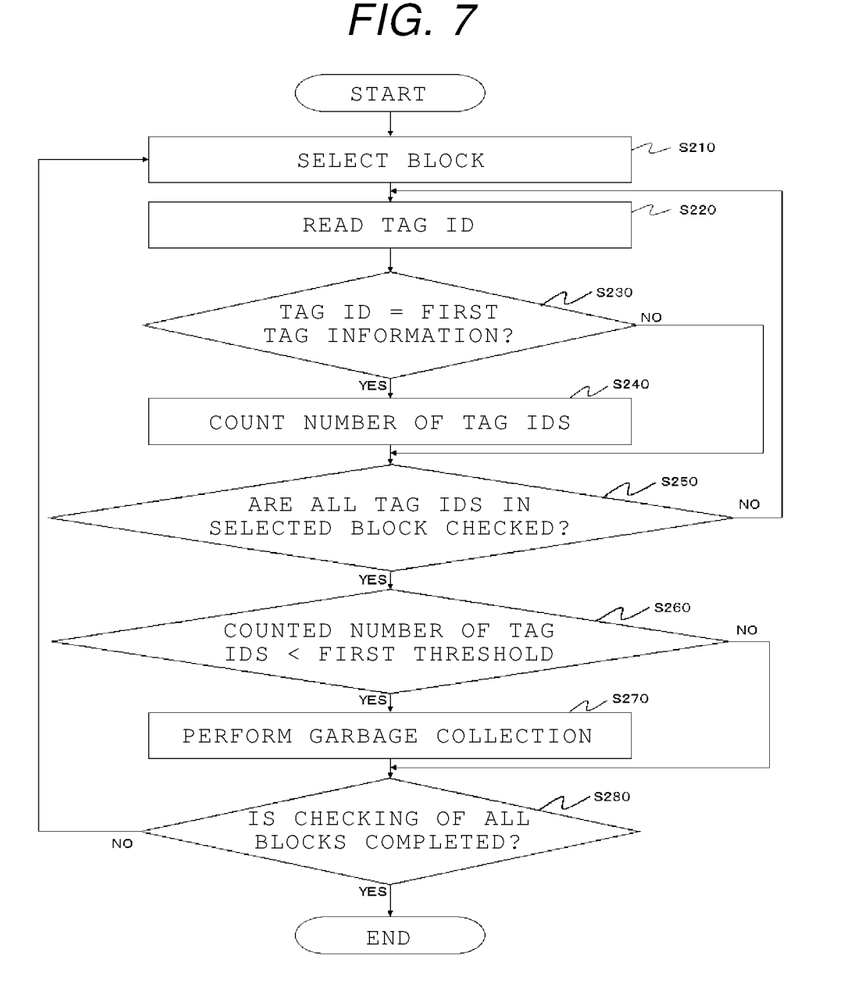
FIG. 7 is a flowchart illustrating a garbage collection process in the memory controller of the memory system according to the first embodiment.

FIG. 7 is a flowchart illustrating a garbage collection process in the memory controller of the memory system according to the first embodiment. In description of the embodiment, for example, the garbage collection process is performed using, as a reference, data written when the average number of erasures is 1 to 5 times. That is, data at a physical address corresponding to a logical address to which the tag ID=1 is allocated at the time of present tag ID=4 serves as a reference of the garbage collection. The tag ID serving as the reference of the garbage collection is first tag information. That is, in description of the embodiment, the first tag information is the tag ID=1.

The memory controller 20 selects any block which is a garbage collection target in the flash memory 10 (S210).

The memory controller 20 selects any physical address of the selected block. The memory controller 20 reads the tag ID corresponding to the selected physical address from the tag ID management table T1b (S220).

The memory controller 20 checks whether the read tag ID is the first tag information (S230). In the embodiment, data at the physical address corresponding to the logical address to which the same tag ID as the first tag information is allocated is a garbage collection target. In description of the embodiment, since the first tag information is the tag ID=1, it is checked whether the read tag ID is the tag ID=1.

When the read tag ID is not the first tag information (NO in S230), the data is not the garbage collection target. Therefore, the process proceeds to step S250. On the other hand, when the read tag ID is the first tag information (YES in S230), the data is the garbage collection target. Therefore, the number of tag IDs is counted (S240).

Subsequently, the memory controller 20 checks if all the tag IDs allocated to the logical addresses corresponding to the physical addresses of the selected block have been checked for the first tag information (S250). When the confirmation is not performed whether all the tag IDs allocated to the logical addresses corresponding to the physical addresses of the selected block are the first tag information (NO in S250), the process returns to step S220.

When all the tag IDs allocated to the logical addresses corresponding to the physical addresses of the selected block have been checked for the first tag information (YES in S250), the memory controller 20 determines whether the counted number of tag IDs of the first tag information is less than a first threshold value (S260). Here, the first threshold value is, for example, half of the total number of tag IDs in one block. In the embodiment, the first threshold value is set to half of the total number of tag IDs in one block, but the embodiment is not limited thereto. Any value may be used.

When the counted number of tag IDs of the first tag information is less than the first threshold value (YES in S260), the garbage collection is performed on data written in the physical addresses corresponding to the logical addresses to which the first tag information in the selected block is allocated (S270). On the other hand, when the counted number of tag IDs of the first tag information is equal to or greater than the first threshold value (NO in S260), the garbage collection is not performed and the process proceeds to step S280. When the counted number of tag IDs of the first tag information is equal to or greater than the first threshold value, it is conceivable that the data with the same tag ID is already stored in one block. Therefore, the garbage collection is not performed.

The memory controller 20 checks whether the operations of steps S220 to S270 have been performed on all the blocks which are garbage collection targets (S280).

When the operations of steps S220 to S270 have not been performed on all the blocks which are the garbage collection targets (NO in S280), the process returns to step S210. On the other hand, when the operations of steps S220 to S270 have been performed on all the blocks which are the garbage collection targets (YES in S280), the garbage collection is completed.

In description of the embodiment, when the present tag ID=4, the data at the physical address corresponding to the logical address to which the tag ID=1 is allocated is the first tag information which serves as the reference of the garbage collection. The tag ID serving as the reference of the garbage collection is not limited thereto. For example, when the present tag ID=6, data at the physical address corresponding to the logical address to which the tag ID=1 is allocated may serve as the reference of the garbage collection, and any interval between the present tag ID and the tag ID serving as the reference of the garbage collection may be determined.

For example, when the average number of erasures is 131 to 135 times, that is, when the present tag ID allocation is the tag ID=12 at the second round, the tag ID=9 is set as the tag ID serving as the reference of the garbage collection. At this time, data to which the tag ID=9 is allocated corresponds to data written when the average number of erasures is 41 to 45 times and data written when the average number of erasures is 116 to 120 times. However, in either case, the tag ID=9 is allocated and the tag IDs are the same, and therefore, the same process is performed.

(Advantages)

As described above, by performing the garbage collection using the data with the same tag ID as the reference, it is possible to collect the data written during substantially the same time period, in one block. That is, after the garbage collection is performed, it is possible to inhibit the data in the same block from being segmented. Further, when the number of tag IDs serving as the reference of the garbage collection is less than the first threshold value, the garbage collection is performed, and thus it is not necessary to perform the garbage collection on a block in which the data written during substantially the same time period is already stored therein. Accordingly, it is possible to inhibit unnecessary garbage collection and it is possible to improve performance of rewriting (writing and erasing) and prolong a lifetime of the block.

In the embodiment, the first threshold value is half of the total number of tag IDs in one block, as described above. When the first threshold value is made smaller, it is possible to reduce the frequency of the garbage collection process and prolong a lifetime of the block. When the first threshold value is made larger, the frequency of the garbage collection process increases, but it is possible to further collect the data written during substantially the same time period in one block.

Second Embodiment

A memory system according to a second embodiment will be described with reference to FIGS. 8 to 14. The second embodiment is different from the first embodiment in that a block unit tag ID management table is provided in addition to a tag ID management table. Except that the block unit tag ID management table is provided in addition to the tag ID management table, the second embodiment is the same as the first embodiment. Therefore, the same reference numerals are given and detailed description thereof will not be repeated.

(Configuration)

A configuration of an information processing system including the memory system according to the second embodiment will be described with reference to FIGS. 8 to 10.

Figure 8:
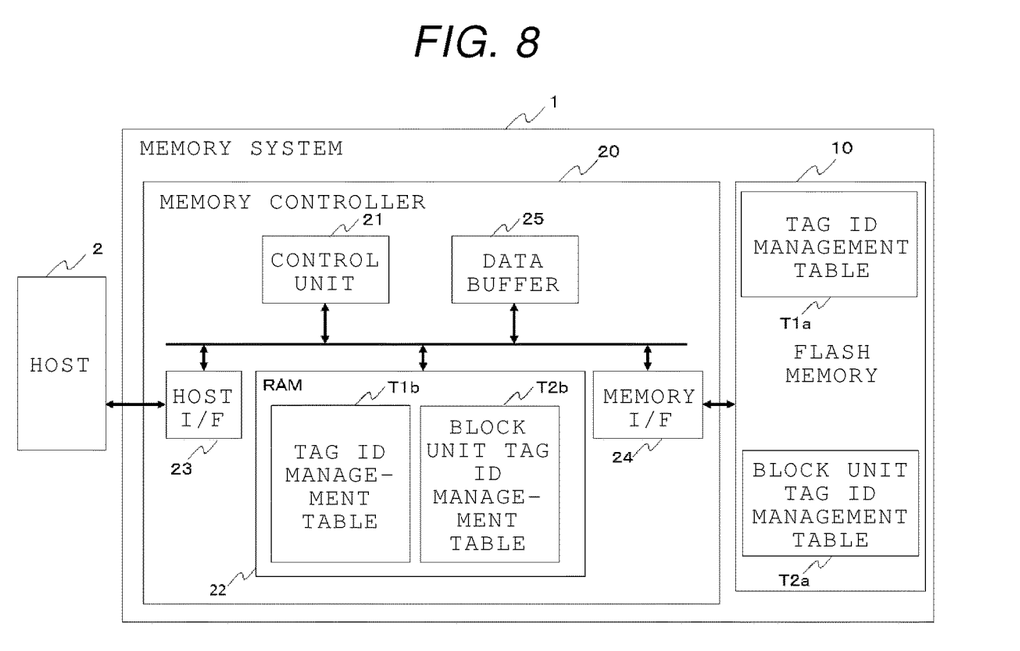
FIG. 8 is a block diagram illustrating an example of a configuration of a memory system according to a second embodiment.

FIG. 8 is a block diagram illustrating an example of a configuration of the memory system according to the second embodiment.

As illustrated in FIG. 8, the flash memory 10 can store a block unit tag ID management table T2a in addition to the tag ID management table T1a. The RAM 22 can store, for example, data of the block unit tag ID management table T2a loaded from the flash memory 10 into a block unit tag ID management table T2b.

Figure 9:
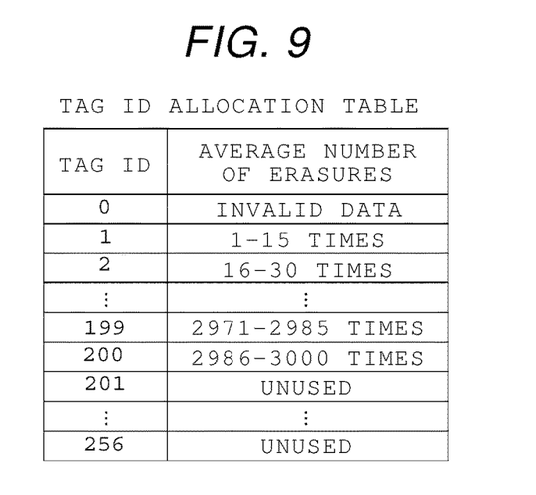
FIG. 9 is a diagram illustrating an example of a configuration of a tag information allocation table used in the memory system according to the second embodiment.

FIG. 9 is a diagram illustrating an example of a configuration of a tag information allocation table used in the memory system according to the second embodiment. In the embodiment, for example, a lifetime of the number of rewrites in the flash memory 10 is assumed to be 3,000 times. In the embodiment, to correspond to the lifetime of the number of rewrites in the flash memory 10, the tag ID is allocated based on the average number of erasures so that the tag ID increases by 1 whenever the average number of erasures increases 15 times with 8 bits. For the tag IDs, a tag ID=0 to a tag ID=200 are used among the tag ID=0 to a tag ID=256. The tag ID=0 indicates invalid data as in the first embodiment. In the embodiment, the tag IDs are not circulated. In the embodiment, the lifetime of the number of rewrites is assumed to be 3,000 times, but the embodiment is not limited thereto. In accordance with the lifetime of the number of rewrites, an information amount of tag IDs may be changed or an average number of erasures in which the tag ID increases by 1 may be set to any number of times.

Figure 10A:
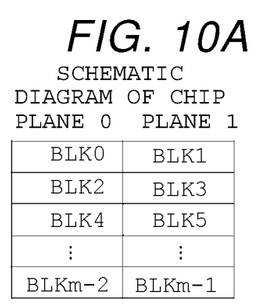
FIG. 10A is a diagram schematically illustrating a plurality of nonvolatile memories in the memory system according to the second embodiment and FIG. 10B is a diagram illustrating an example of a configuration of a second tag information management table used in the memory system according to the second embodiment.
Figure 10B:
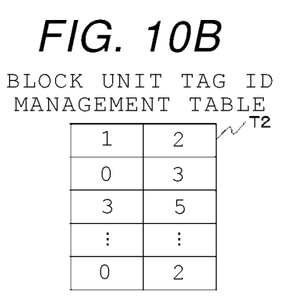

FIG. 10A is a diagram schematically illustrating nonvolatile memories in the memory system according to the second embodiment. FIG. 10B is a diagram illustrating an example of a configuration of a second tag information management table used in the memory system according to the second embodiment.

The second tag information management table is a table in which representative tag information of the first tag information management table is managed. In the embodiment, the second tag information management table manages the representative tag information in the block unit of the first tag information management table and is the block unit tag ID management tables T2 (T2a and T2b).

Specifically, as illustrated in FIG. 10A, the flash memory 10 is partitioned for each block. As illustrated in FIG. 10B, in the block unit tag ID management table T2, a representative tag ID of each of a plurality of blocks of the flash memory 10 in the tag ID management table T1 is managed. In the embodiment, the representative tag ID is a minimum tag ID. For example, when a minimum tag ID allocated to a logical address corresponding to a physical address in a 4 KB unit in a block BLK1 is the tag ID=2, the tag ID=2 is recorded in the block unit tag ID management table T2 corresponding to the block BLK1.

(Operation)

An operation of the memory system according to the second embodiment will be described with reference to FIGS. 11 to 14.

(Write Operation and Tag ID Write Operation)

Figure 11:
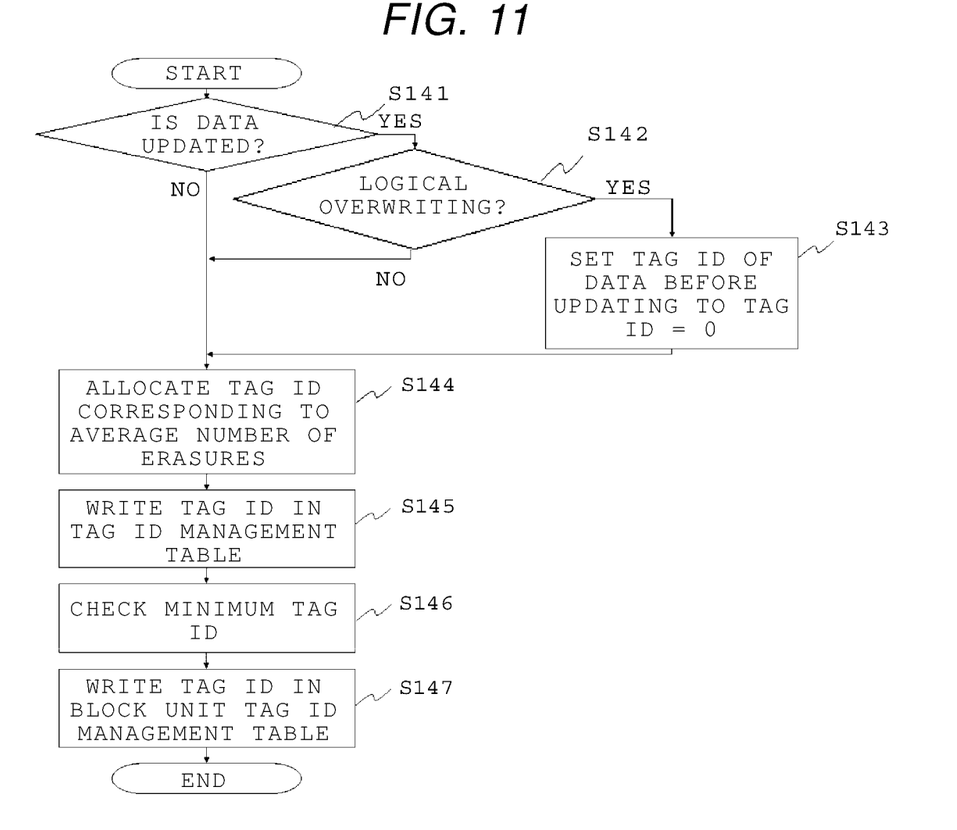
FIG. 11 is a flowchart illustrating the tag information write process during a write operation in a memory controller of the memory system according to the second embodiment.

FIG. 11 is a flowchart illustrating the tag information write process during a writing operation in a memory controller of the memory system according to the second embodiment. A more detailed ID write management sequence in step S140 illustrated in FIG. 4 in the memory controller will be described with reference to FIG. 11. The steps except for step S140 are the same as those of the first embodiment, and thus detailed description thereof will not be repeated.

Steps S141 to S145 are the same as those of FIG. 5.

The memory controller 20 checks the minimum tag ID described in the tag ID management table T1b in the block including a physical address at which new data or updated data is stored (S146). It is noted that the tag ID=0 which is invalid data is excluded.

Subsequently, the memory controller 20 writes the checked minimum tag ID to the block unit tag ID management table T2b corresponding to the block including the physical address at which the new data or the updated data is stored (S147).

When the tag ID writing to the tag ID management table T1b and the minimum tag ID writing to the block unit tag ID management table T2b are completed, the process proceeds to step S150 illustrated in FIG. 4. In this way, the write operation and the tag ID write operation are completed.

(Garbage Collection)

Figure 12:
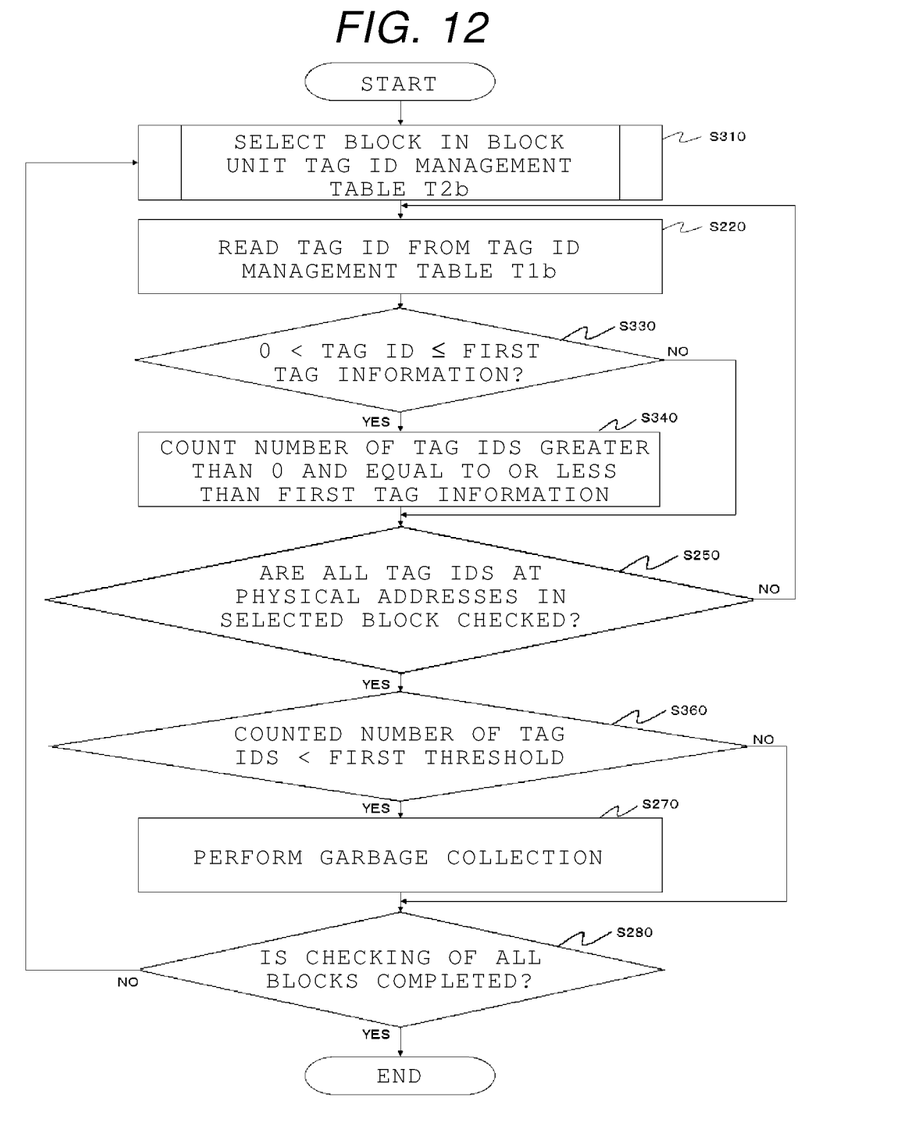
FIG. 12 is a flowchart illustrating a garbage collection process in the memory controller of the memory system according to the second embodiment.

FIG. 12 is a flowchart illustrating a garbage collection process in the memory controller of the memory system according to the second embodiment. A garbage collection operation in the memory controller will be described with reference to FIG. 12. It is noted that detailed description of the same steps as in FIG. 7 will not be repeated and points different from those in FIG. 7 will be described.

The memory controller 20 selects a block using the block unit tag ID management table T2b (S310). A block selection method will be described below.

The memory controller 20 selects any physical address of the selected block as in the first embodiment. The memory controller 20 reads the tag ID allocated to the logical address corresponding to the selected physical address from the tag ID management table T1b (S220). The memory controller 20 may read the minimum tag ID in the selected block in S330 at first.

The memory controller 20 checks whether the tag ID read from the tag ID management table T1b is greater than the tag ID=0 and equal to or less than the first tag information (S330). That is, it is checked whether the read tag ID is equal to or less than the first tag information excluding the tag ID=0 which is the tag information of invalid data. When the read tag ID is greater than the tag ID=0 and equal to or less than the tag ID which is a garbage collection target (YES in S330), the number of tag IDs greater than the tag ID=0 and equal to or less than the first tag information is counted (S340). When the read tag ID is greater than the first tag information (NO in S330), the read tag ID is not the garbage collection target. Therefore, the process proceeds to step S250. If the memory controller 20 reads the minimum tag ID in the selected block in S330 at first (S220), the selected block is not the garbage collection target when the read tag ID is greater than the first tag information (NO in S330). Therefore, the process may proceed to step S250.

Subsequently, if all tag IDs allocated to the logical addresses corresponding to the physical addresses in the selected block have been checked for: greater than the tag ID=0 and equal to or less than the first tag information (S250). When all tag IDs allocated to the logical addresses corresponding to the physical addresses in the selected block have not been checked for: greater than the tag ID=0 and equal to or less than the first tag information (NO in S250), the process returns to step S220.

When all tag IDs allocated to the logical addresses corresponding to the physical addresses in the selected block have been checked for: greater than the tag ID=0 and equal to or less than the first tag information (YES in S250), the memory controller 20 determines whether the counted number of tag IDs greater than the tag ID=0 and equal to or less than the first tag information is less than the first threshold value (S360).

When the counted number of tag IDs greater than the tag ID=0 and equal to or less than the first tag information is less than the first threshold value (YES in S360), the garbage collection is performed on data written in the physical addresses corresponding to the logical addresses to which tag IDs greater than the tag ID=0 and equal to or less than the first tag information in the selected block is allocated (S270). On the other hand, when the counted number of tag IDs greater than the tag ID=0 and equal to or less than the first tag information is equal to or greater than the first threshold value (NO in S360), the garbage collection is not performed and the process proceeds to step S280.

In description of the embodiment, for example, when the average number of erasures of the flash memory 10 is 21 to 25 times, that is, the tag ID serving as a reference of the garbage collection which is the first tag information at the time of the tag ID=5 is set to the tag ID=2. At this time, the data at the physical addresses to which the tag ID=1 and the tag ID=2 are written in the tag ID management table T1b is a garbage collection target.

Figure 13:
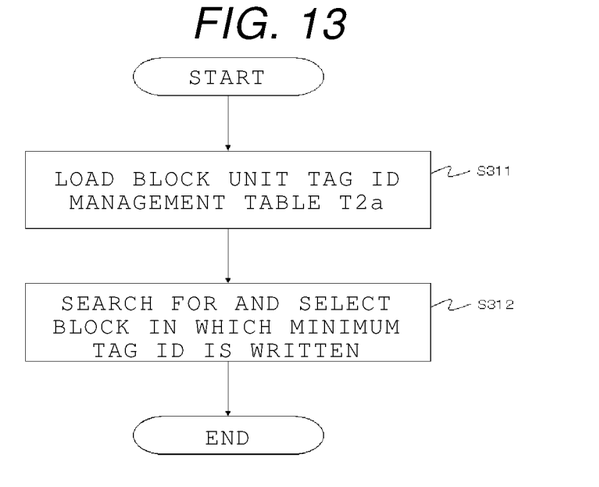
FIG. 13 is a flowchart illustrating a part of the garbage collection process in the memory controller of the memory system according to the second embodiment.

FIG. 13 is a flowchart illustrating a part of the garbage collection process in the memory controller of the memory system according to the second embodiment. Step S310 illustrated in FIG. 12 will be described in more detail with reference to FIG. 13.

The memory controller 20 reads the data of the block unit management table T2a from the flash memory 10 and loads the data into the block unit management table T2b stored in the RAM 22 (S311). When the data of the block unit management table T2a is already read from the flash memory 10 and loaded into the block unit management table T2b stored in the RAM 22, the block unit management table T2a does not need to be read. A timing at which the memory controller 20 reads the data of the block unit management table T2a from the flash memory 10 and loads the data into the block unit management table T2b stored in the RAM 22 is not limited thereto.

Subsequently, the memory controller 20 searches for and selects a block in which the minimum tag ID is recorded in the block unit tag ID management table T2b (S312). Then, the process proceeds to step S220 of FIG. 12.

(Read Disturbance Inspection Sequence)

In the flash memory 10, a data read operation is performed on a selected memory cell. However, a voltage exceeding a threshold voltage is applied not only to the selected memory cell but also to non-selected memory cells around the selected memory cell. Therefore, read disturbance occurs in which the non-selected memory cells around the selected memory cell also enter a weak written state and is changed so that a threshold voltage is raised. The read disturbance results in deterioration in reliability of the memory system 1 because of an increase in a bit error rate of the flash memory 10. Accordingly, for example, the reliability is maintained by performing a new block rewrite operation on data written in a block in which read disturbance inspection to be described below is performed and corrected data is considerable. Hereinafter a processing operation for the read disturbance inspection according to the embodiment will be described with reference to FIG. 14.

Figure 14:
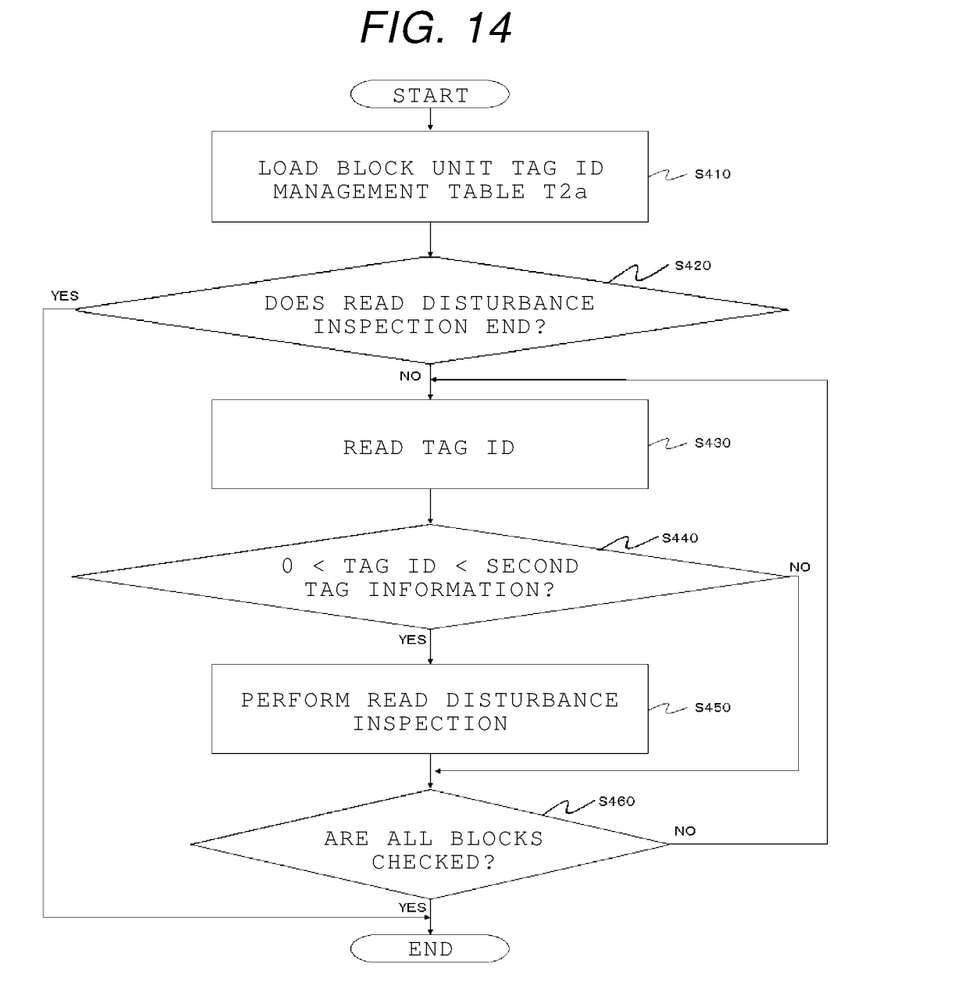
FIG. 14 is a flowchart illustrating a processing operation for read disturbance inspection in the memory controller of the memory system according to the second embodiment.

FIG. 14 is a flowchart illustrating the processing operation for the read disturbance inspection in the memory controller of the memory system according to the second embodiment.

As illustrated in FIG. 14, the memory controller 20 reads the data of the block unit management table T2a from the flash memory 10 and loads the data into the block unit management table T2b stored in the RAM 22 when the memory system 1 is powered on (S410). In the embodiment, when the memory system 1 is powered on, the data of the block unit management table T2a is read. The timing at which the block unit management table T2a is read is not limited thereto.

The memory controller 20 checks whether the read disturbance inspection ends (S420). In the read disturbance inspection, for example, a read voltage is shifted and applied to an inspection target block and the read data is passed through an error correcting code (ECC) correction circuit to inspect the amount of corrected data. Here, countermeasures are taken against the read disturbance by rewriting data written in the block in which the corrected data is considerable to a new block.

When the read disturbance inspection has ended (YES in S420), the processing operation for the read disturbance inspection is completed. On the other hand, when the read disturbance inspection has not ended (NO in S420), any block is selected from the block unit tag ID management table T2b stored in the RAM. The memory controller 20 reads the minimum tag ID in the block unit described in the block unit management table T2b of the selected block (S430).

The memory controller 20 determines whether the read minimum tag ID in the block unit is greater than the tag ID=0 and less than the tag ID serving as the reference of the read disturbance inspection (S440). In the embodiment, the tag ID serving as the reference of the read disturbance inspection is the second tag information. In description of the embodiment, the second tag information is assumed to be the tag ID=4.

When the read minimum tag ID in the block unit is equal to or greater than the second tag information (NO in S440), the process proceeds to step S460. On the other hand, when the read minimum tag ID in the block unit is greater than the tag ID=0 and less than the second tag information (YES in S440), the read disturbance inspection is performed on the block with the tag ID greater than the tag ID=0 and less than the second tag information serving as the reference of the read disturbance inspection (S450). In the embodiment, the second tag information is the tag ID=4. Therefore, when the read minimum tag ID in the block unit is one of the tag IDs=1, 2, and 3, the read disturbance inspection is performed on the selected block.

Subsequently, the memory controller 20 determines if all the minimum tag IDs in the block unit tag ID management table T2b have been checked for: greater than the tag ID=0 and less than the second tag information (S460).

When all the tag IDs in the block unit tag ID management table have not been checked for: greater than the tag ID=0 and less than the second tag information (NO in S460), the process returns to step S430.

When all the tag IDs in the block unit tag ID management table have been checked for: greater than the tag ID=0 and less than the second tag information (YES in S460), the processing operation for the read disturbance inspection is completed. After the inspection, a new block rewrite operation may be performed on blocks determined to contain considerable amount of corrected data during the read disturbance inspection.

In the embodiment, it is checked whether the read disturbance inspection ends, but the embodiment is not limited thereto. For example, it may be checked whether a read operation has been performed for a predetermined number of times or more from the previous read disturbance inspection. In this case, when the read operation has not been performed the predetermined number of times or more from the previous read disturbance inspection, the read disturbance inspection sequence ends. On the other hand, when the read operation has been performed the predetermined number of times or more from the previous read disturbance inspection, the process proceeds to step S430.

(Advantages)

As described above, in the second embodiment, it is possible to obtain the same advantages as those of the first embodiment. In the embodiment, the tag IDs are not circulated. Therefore, when the tag ID which is the garbage collection target is greater than the tag ID=0 and equal to or less than the first tag information, data which is substantially the same as the first tag information or has an updating frequency less than the first tag information is a target. Accordingly, it is possible to collect data with a low updating frequency more efficiently than in the first embodiment. Further, by providing the block unit tag ID management table T2a and T2b, it is possible to perform the read disturbance inspection mainly on the block containing data with the low updating frequency. That is, it is possible to find the read disturbance efficiently and earlier, and thus it is possible to improve reliability. When the garbage collection is performed, the block in which there is the data with the low updating frequency can be preferentially selected and the garbage collection can be performed by using the block unit tag ID management table. Thus, it is possible to perform the garbage collection more efficiently.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A memory system comprising:
a nonvolatile memory including a plurality of blocks; and
a memory controller configured to control the nonvolatile memory and further configured to:
store in a first tag information management table, first tag information allocated to an address of a first block of the plurality of blocks, wherein the first tag information contains a value that is representative of an aggregate number of times that any of the plurality of blocks have been erased;
determine how many addresses of the first block both (1) have valid data stored thereat and (2) have tag information allocated thereto containing values that are less than or equal to a comparison tag value;
perform garbage collection on the first block when the determined number of addresses of the first block is less than a threshold value; and
determine not to perform garbage collection on the first block when the determined number of addresses of the first block is greater than or equal to the threshold value.

2. The memory system according to claim 1, wherein the address is a logical address.

3. The memory system according to claim 1, wherein the first tag information is allocated when data is written to the first block.

4. The memory system according to claim 1, wherein the memory controller is further configured to:
allocate tag information to addresses that correspond to fixed-unit sizes of data stored in the nonvolatile memory.

5. The memory system according to claim 1, wherein the memory controller is further configured to:
store in a second tag information management table, representative tag information of the first block; and
perform read disturbance inspection on the first block based on the second tag information management table.

6. The memory system according to claim 5, wherein the representative tag information of the first block equals a read disturbance inspection reference value (1) that is allocated to one of a plurality of addresses of the first block and (2) that is stored in the first tag information management table, the read disturbance inspection reference value having the smallest numerical value relative to all other tag information that is associated with the first block and that is stored in the first tag information management table.

7. The memory system according to claim 5, wherein the memory controller only performs the read disturbance inspection on the first block if the representative tag information of the first block is less than a read disturbance inspection reference value.

8. A method of operating a memory system that includes a nonvolatile memory with a plurality of blocks, said method comprising:
storing in a first tag information management table, first tag information allocated to an address of a first block of the plurality of blocks, wherein the first tag information contains a value that is representative of an aggregate number of times that any of the plurality of blocks have been erased;
determining how many addresses of the first block both (1) have valid data stored thereat and (2) have tag information allocated thereto containing values that are less than or equal to a comparison tag value;
performing garbage collection on the first block when the determined number of addresses of the first block is less than a threshold value; and
determining not to perform garbage collection on the first block when the determined number of addresses of the first block is greater than or equal to the threshold value.

9. The method according to claim 8, further comprising:
performing read disturbance inspection on the first block based on representative tag information of the first block, the representative tag information being stored in a second tag information management table,
wherein the representative tag information of the first block equals a read disturbance inspection reference value (1) that is allocated to one of a plurality of addresses of the first block and (2) that is stored in the first tag information management table, the read disturbance inspection reference value having the smallest numerical value relative to all other tag information that is associated with the first block and that is stored in the first tag information management table.

* * * * *